United States Patent Office 3,200,799
Patented Aug. 17, 1965

3,200,799
INTERNAL COMBUSTION ENGINE
Frederick Charles Hammick, Prospect, South Australia, Australia, assignor to MacLane Manufacturing Company Limited, Nailsworth, South Australia, Australia
Filed Mar. 14, 1962, Ser. No. 179,676
Claims priority, application Australia, Mar. 22, 1961, 2,855/61
4 Claims. (Cl. 123—53)

This invention relates to an improved internal combustion engine operable on a modified Atkinson cycle.

The Atkinson cycle is a theoretical working cycle for an internal combustion engine characterised in that the expansion ratio exceeds the compression ratio so as to achieve higher efficiency, but the mechanical problems associated with the Atkinson cycle are such that heretofore it has not proved economically or mechanically practicable.

In this invention expansion takes place in two cylinders of a charge which is induced and partially compressed in one cylinder but finally compressed in the two cylinders into a common combustion chamber.

By use of this invention, a substantially simple mechanical engine can give a thermal efficiency which is improved beyond that normally obtained by the conventional engine which utilises the Otto or "constant volume" cycle. Since a higher efficiency is obtainable, it follows that heat waste is reduced, and therefore the cooling system of an engine according to this invention can be simpler than previously proposed cooling systems. A further advantage of the increased efficiency is a decrease in fuel consumption which can be achieved with this engine.

In its simplest form the invention may be said to consist of a four stroke combustion engine characterised by a pair of adjacent cylinders in line, an inlet valve in one cylinder, an exhaust valve in the other cylinder, an interflow duct between the cylinders, an isolating valve between cylinders operable to open or close the interflow duct, and pistons in phase or nearly in phase with each other reciprocable in the cylinders, the timing of the valves permitting induction into one only of the cylinders but expansion in both cylinders.

Figure 1:
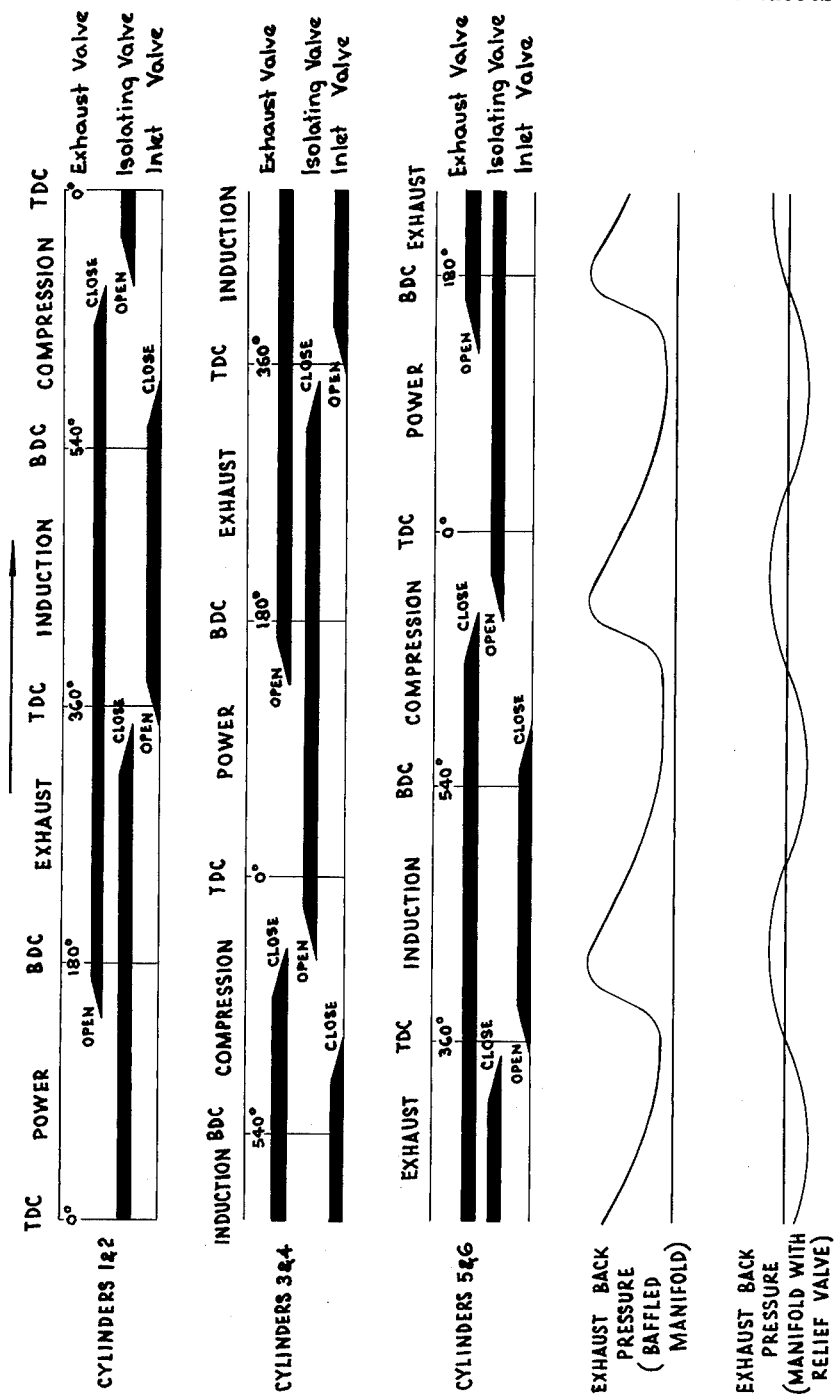
Figure 2:
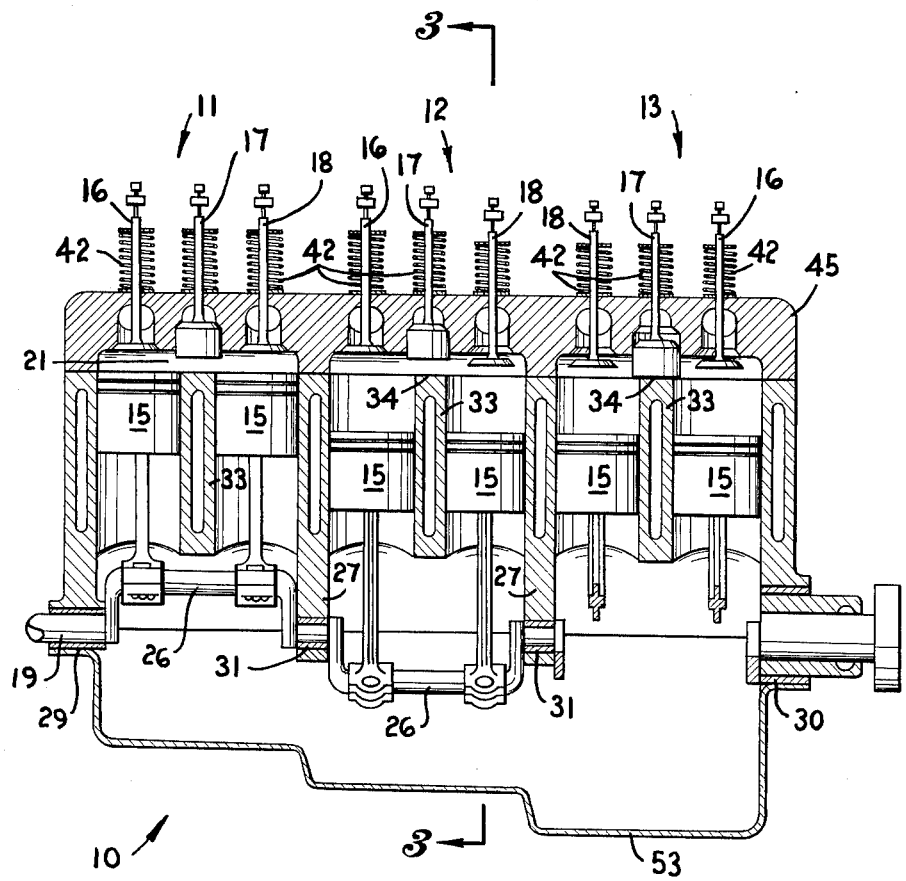
Figure 3:
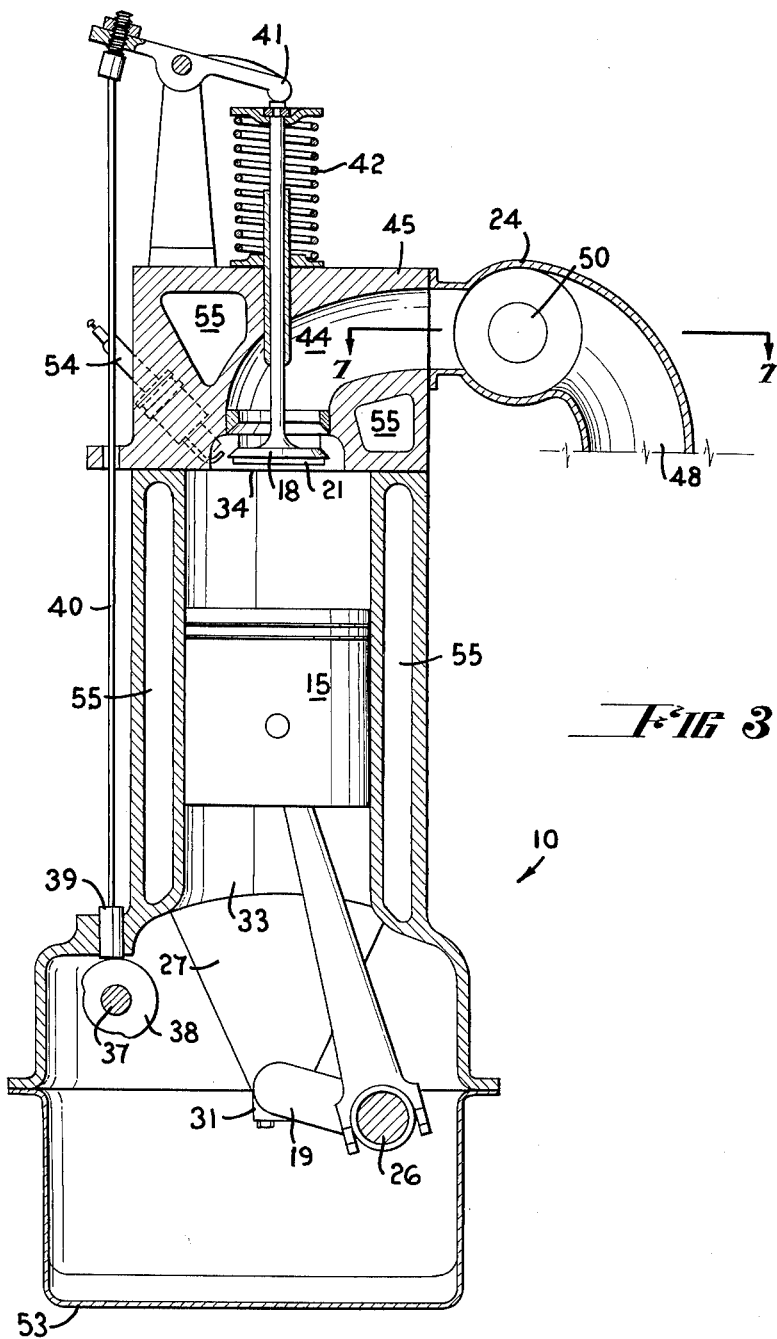
Figure 4:
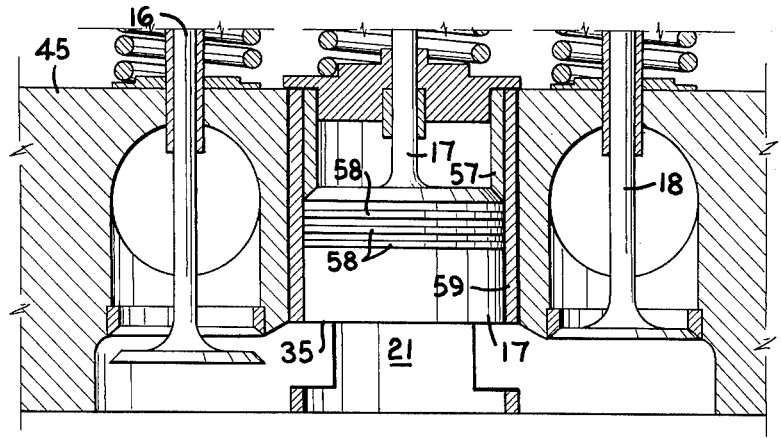
Figure 5:
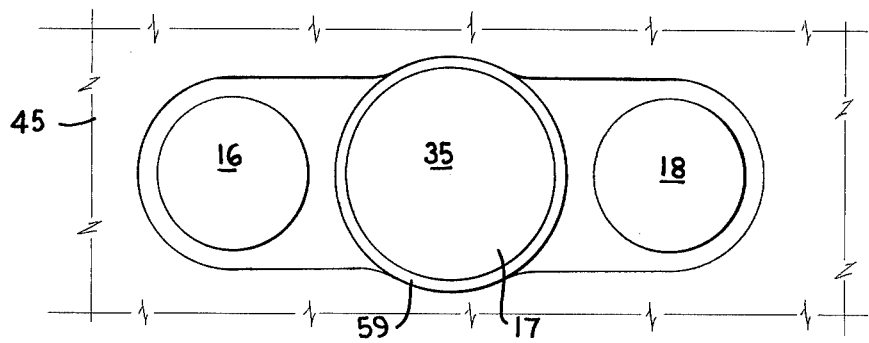
Figure 6:
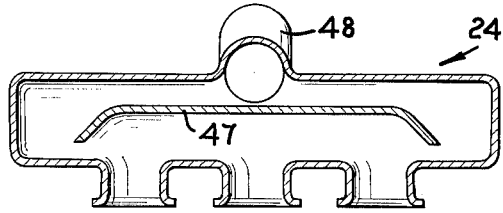
Figure 7:
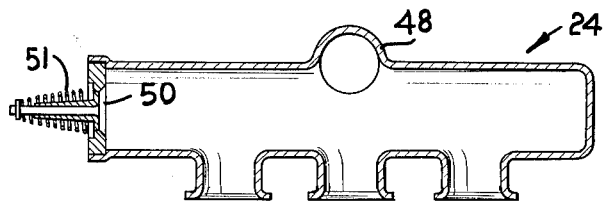
Figure 8:
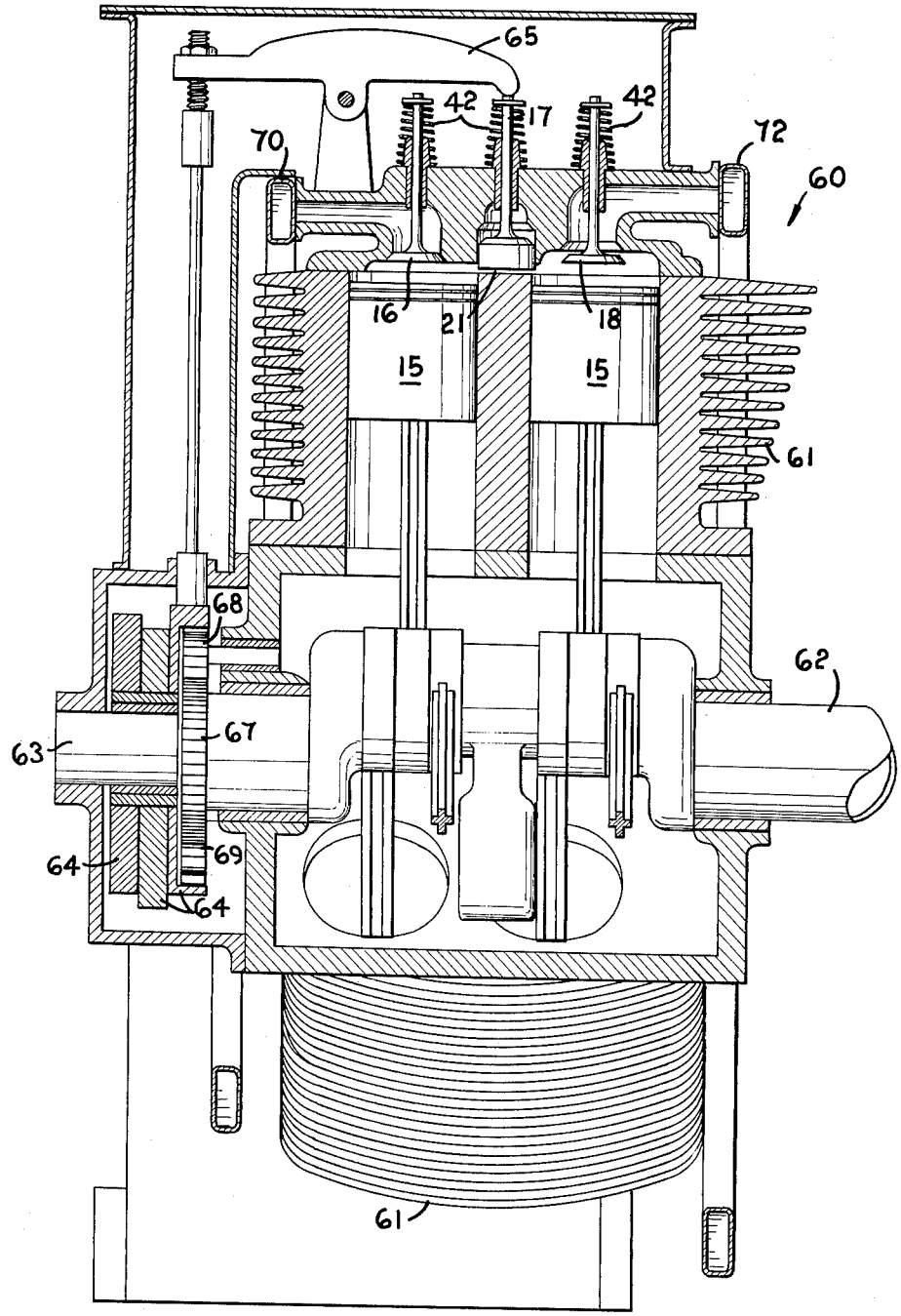
Figure 9:
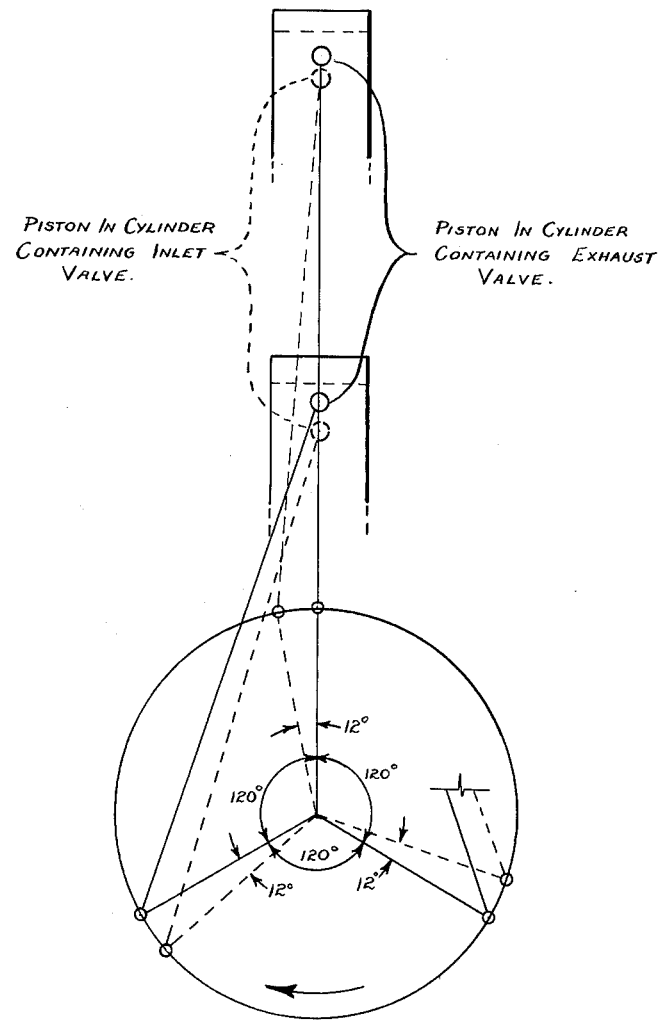

Embodiments of the invention are described hereunder in some detail with reference to and are illustrated in the accompanying drawings, in which:

FIG. 1 is a stretch out showing schematically the valve diagrams of three pairs of cylinders, and also illustrates the exhaust back pressure for both a baffled exhaust manifold and a manifold with a relief valve, FIG. 2 is a simplified elevational section of a six cylinder engine construction according to the invention, FIG. 3 is a cross-section on lines 3—3 of FIG. 2 but drawn to an enlarged scale, FIG. 4 is a section showing the valve arrangement as illustrated in the centre pair of cylinders in FIG. 2, but drawn to an enlarged scale, FIG. 5 is an underside view of FIG. 4, FIG. 6 is a sectioned plan taken on lines 6—6 of FIG. 3 and illustrating a baffle type of exhaust manifold which can be used with the invention, FIG. 7 is a similar view to FIG. 6 but showing a manifold with a relief valve therein, FIG. 8 is a part elevational section through a three cylinder radial engine illustrating how the invention may be applied to a radial as well as in-line engines, and FIG. 9 shows diagrammatically the crank angles of the pistons when the piston of each pair in the cylinder containing the inlet valve lags the piston in the cylinder containing the outlet valve.

Referring first to FIGS. 1 to 5, an engine 10 is a six cylinder in-line engine in which the cylinders are arranged in three pairs 11, 12 and 13 respectively. The valve diagram of FIG. 1 illustrates the conditions of the engine when the pistons are in the position shown in FIGS. 2 and 3, and the firing order is 11, 12, 13, (although the firing order can be 11, 13, 12 if desired).

When the pistons 15 of the first pair of cylinders 11 are at their top dead centre before the power stroke commences, the inlet valve 16 is closed, the isolating valve 17 is open, and the exhaust valve 18 is closed. As the crankshaft 19 rotates, the exhaust valve 18 commences to open at a point removed one hundred and forty degrees from top dead centre while the isolating valve 17 is still open. The exhaust gases are then exhausted outwardly directly through the valve 18 from the second of the cylinders of the pair 11, and are exhausted from the other cylinder 11 through the interflow duct 21 between the cylinders of the pair 11 and then through the exhaust valve 18. At three hundred and fifty degrees of rotation the isolating valve 17 drops to baffle any flow which might tend to continue to take place through the interflow duct 21, and six degrees thereafter, that is at three hundred and fifty-six degrees, the inlet valve 16 commences to open. Thus the inlet takes place in the first only of the cylinders of the first pair 11, since the isolating valve 17 remains closed during the entire induction stroke. The inlet valve does not close until five hundred and seventy-eight degrees, that is as compression commences. In the meantime however the exhaust valve 18 is open and any super atmospheric pressure existing in the exhaust manifold 24 has the effect of urging the second of the pistons 15 downwardly so that work is thereby done on the second of the pistons 15 during the induction stroke.

The exhaust valve closes at six hundred and seventy degrees of rotation, and at the same time the isolating valve commences to open so that the final portion of the compression stroke compresses a small quantity of exhaust gases with the fresh charge and this has been found in itself to greatly reduce the tendency to knock. Further to this, there is a great deal of turbulence introduced to the gases during the last stages of compression and this is also effective in reducing the tendency to knock. Thus in this embodiment a compression ratio in this order of 10:1 has proved satisfactory on low octane fuels, and 13:1 for high octane fuels. The high compression ensures rapid flame propagation notwithstanding the reduction in the tendency to detonate.

As the expansion commences, it will be seen that the isolating valve 17 is fully open so that expansion again occurs and the cycle is repeated. The same cycle is repeated in cylinders 5 and 6 which are displaced two hundred and forty degrees from cylinders 1 and 2, and cylinders 3 and 4 are displaced two hundred and forty degrees from cylinders 5 and 6.

A study of FIG. 1 will indicate that when a baffled exhaust manifold is used the exhaust back pressure from one pair of cylinders is highest when an exhaust valve of another pair of cylinders is open and the first cylinder of said other pair is moving downwardly while second is inducing the fresh charge, so that the exhaust from one pair of cylinders will then urge one piston of another pair downwardly. This set of conditions only occurs however when three pairs of cylinders are arranged at two hundred and forty degree intervals.

Referring now to the drawings of FIGS. 2 to 7 respectively, the crankshaft 19 is arranged with three pairs of cranks 26 which are displaced, as said, two hundred and forty degrees from each other. Adjacent bearing surfaces on each of the cranks 26 are in alignment in this embodiment, that is, the pistons of each pair are in phase, but if desired the second piston in each pair may lead the first by an angle of about twelve degrees. This arrangement is illustrated diagrammatically in FIG. 9. The cylinder block wall 27 extends downwardly between each pair of pistons 11 and 12, and 12 and 13 respectively so that the crankshaft 19 is carried in a front bearing 29, a rear bearing 30 and two intermediate bearings 31. The crank throw is considerable when compared with the piston diameter, a long stroke motor being preferred for the reason that, during expansion, the effective area is twice the area of a single piston.

The portions 33 of the cylinder block wall disposed between the pistons of each pair 11, 12 and 13 respectively are substantially broad and their upper faces 34 are adjacent the lower flat faces 35 of the isolating valves 17 when the isolating valves 17 drop to close the interflow ducts 21.

The inlet valves 16 function in the usual way, being operated by cams on the cam shaft 37, the lift sector of the cam occupying about two hundred and twenty-four degrees of crank angle (that is one hundred and twelve degrees of cam angle).

The exhaust valves 18 are also depressed in the usual way, being operated by the exhaust cams 38 which engage slidable cam followers 39, the push rods 40 operating a valve rocker 41, while the valves in each case are returned by the valve return springs 42.

The exhaust gases pass outwardly through the exhaust conduits 44 in the cylinder head 45 and into the exhaust manifold 24.

The exhaust manifold 24 may comprise one of two forms. The manifold illustrated in FIG. 6 has a baffle 47 which has the effect of maintaining a comparatively high pressure in the vicinity of the exhaust conduits 44, before the exhaust gases pass outwardly through the exhaust pipe 48.

In the manifold illustrated in FIG. 7, one end of the exhaust manifold 24 has a relief valve 50 which is lightly spring loaded by the spring 51 and which is normally closed, but if for some reason the pressure within the exhaust manifold 24 becomes sub-atmospheric, the valve 50 opens, thereby reducing pumping losses. This is operative, for example, during periods of sudden acceleration. This arrangement of course reduces or eliminates work done on a piston by super-atmospheric pressure in the exhaust manifold, but it also prevents sub-atmospheric pressure in the exhaust manifold, which could reduce efficiency.

It will be seen that the other ancillaries of the engine, such as the sump 53, the spark plug 54, and the water cooling channels 55 are in accordance with the usual arrangement for automotive engines. It should be noted however that the isolating valve 17 is urged by its return spring 42 to seal on the valve seat number 57 so that during periods of high pressure within cylinders the isolating valve 17 prevents accidental discharge of gases to atmosphere, while the rings 58 reduce losses during compression. The valve 17 is slidable within the cage 59, the walls are apertured to thereby form the interflow duct 21. When the duct 21 is closed, the lower end of the valve 17 extends beyond the lower edge of the duct 21, but its lower flat face 35 need not contact the upper face 34 of the portions 33 of the cylinder block wall, and in practice a clearance of about 0.050 inches is found desirable.

Referring now to FIG. 8, a radial engine 60 has three pairs of cylinders 61 arranged radially about the crankshaft 62. A cam shaft 63 carries on it three cam rings 64 which operate the rockers 65 in the normal manner, one rocker only being shown for the sake of simplicity. The cam rings 64 are driven at one third crankshaft speed by the driving gear 67 on the end of the crankshaft 62 which drives through an idler 68, the idler gear 68 meshing with the internal gear 69 on the cam rings 64.

Each pair of cylinders 61 are arranged in line however and function identically to the cylinders described with reference to the first embodiment, that is one of the pair of cylinders 61 is provided with an inlet valve 16 in communication with an annular inlet manifold 70, an isolating valve 17 between the two cylinders of each pair and an exhaust valve 18 in the second cylinder, the exhaust valve 18 being in communication with an annular exhaust manifold 72. The valves are returned by the valve springs 42 as in the previous embodiment.

If it is proposed to use the invention with five pairs of radially disposed cylinders, each cam would then carry three lobes and the cams would run at one sixth engine speed in the direction of the engine, for seven pairs of cylinders each cam would carry three lobes and run at one sixth engine speed in reverse direction from the engine, and for nine pairs of cylinders each cam would carry five lobes and run at one tenth engine speed and in the direction of the engine.

A consideration of the above embodiments will indicate that the invention makes possible an engine which approaches the Atkinson cycle in its function: it will be seen that the mechanical arrangement is substantially simple notwithstanding that the conventional heat balance factors are re-arranged to give an increased thermal efficiency which reduces the need for a high efficiency cooling water system. It will be appreciated that the cost of the engine is not excessive but is in the same order per brake horse power output as a conventional in-line engine. Further it will be seen that the engine approaches the ideal expansion in which work is carried out first by cooling at constant volume and then cooling at constant pressure, and it has been found that high efficiencies are obtainable from engines constructed according to this invention. These high efficiencies of course result in much lower fuel consumption than the conventional engines of similar power output.

It will of course be seen that the invention can be applied to flat or "V" engines, and other embodiments will be obvious to those skilled in the art.

What I claim is:

1. A four stroke internal combustion engine characterised by a pair of adjacent cylinders in line, an inlet valve in one cylinder, an exhaust valve in the other cylinder, an interflow duct between the cylinders, an insolating valve between the cylinders operable to open or close the interflow duct, pistons reciprocable in the cylinders, the pistons being in phase or nearly in phase with each other and cams on a driven cam shaft controlling valve timing whereby the exhaust valve opens before bottom dead centre of the power stroke and remains open until part of the compression stroke has been completed, the isolating valve opens at a point close to where the exhaust valve closes and closes at or near the end of the exhaust stroke, and the inlet valve opens as or shortly after the isolating valve closes and closes early in the compression stroke.

2. A four stroke internal combustion engine characterised by a pair of adjacent cylinders in line, an inlet valve in one cylinder, an exhaust valve in the other cylinder, an interflow duct between the cylinders, an isolating valve between the cylinders operable to open or close the interflow duct, pistons reciprocable in the cylinders, the pistons being in phase or nearly, in phase with each other, and cams on a driven cam shaft controlling valve timing whereby the exhaust valve opens about one hundred and forty degrees after top dead centre at commencement of the power stroke and remains open until about fifty degrees before said top dead centre, the isolating valve opens as the exhaust valve closes and remains open until about three hundred and fifty degrees after said top dead centre, and the inlet valve opens about six degrees after the isolating valve closes and remains open until about one hundred and forty degrees before said top dead centre.

3. A four stroke internal combustion engine characterised by three pairs of adjacent cylinders in line, an inlet valve in one cylinder of each pair, an exhaust valve in the other cylinder of each pair, an interflow duct between the cylinders of each pair, an isolating valve between the cylinders of each pair operable to open or close the interflow duct, pistons reciprocable in the cylinders, the pistons of each pair being in phase or nearly in phase with each other, and cams on a driven cam shaft controlling valve timing whereby the exhaust valve opens before bottom dead centre of the power stroke and remains open until part of the compression stroke has been completed, the isolating valve opens at a point close to where the exhaust valve closes and closes at or near the end of the exhaust stroke, and the inlet valve opens as or shortly after the isolating valve closes and closes early in the compression stroke.

4. A four stroke internal combustion engine characterised by a pair of adjacent cylinders in line, an inlet valve in one cylinder, an exhaust valve in the other cylinder, an interflow duct between the cylinders, an isolating valve between the cylinders operable to open or close the interflow duct, pistons reciprocable in the cylinders, the pistons being nearly in phase with each other with the piston in the cylinder containing the inlet valve lagging the piston in the cylinder containing the exhaust valve by about twelve degrees of crank angle, and cams on a driven cam shaft controlling valve timing whereby the exhaust valve opens before bottom dead centre of the power stroke and remains open until part of the compression stroke has been completed, the isolating valve opens at a point close to where the exhaust valve closes and closes at or near the end of the exhaust stroke, and the inlet valve opens as or shortly after the isolating valve closes and closes early in the compression stroke.

References Cited by the Examiner

UNITED STATES PATENTS

| | | | |
|---|---|---|---|
| 1,040,508 | 10/12 | Carter | 123—189 |
| 1,245,808 | 11/17 | Shoemaker | 123—53 |
| 1,271,966 | 7/18 | Weeks | 123—53 |
| 1,775,511 | 9/30 | Chapman | 60—29 |
| 1,784,712 | 12/30 | Tisdale | 123—53 |
| 2,110,248 | 3/38 | Wagner | 123—53 |
| 2,212,595 | 8/40 | Fisher | 123—53 |
| 2,250,814 | 7/41 | Rohlin. | |
| 2,506,142 | 5/50 | Echard | 123—53 |
| 2,528,983 | 11/50 | Weiss. | |

FOREIGN PATENTS

| | | |
|---|---|---|
| 202,463 | 10/08 | Germany. |
| 14,341 | 10/84 | Great Britain. |
| 212,830 | 3/24 | Great Britain. |
| 428,049 | 5/35 | Great Britain. |

FRED E. ENGELTHALER, *Primary Examiner*.